(No Model.)
H. W. McNEILL.
CABLE RAILWAY APPARATUS.
No. 390,690. Patented Oct. 9, 1888.
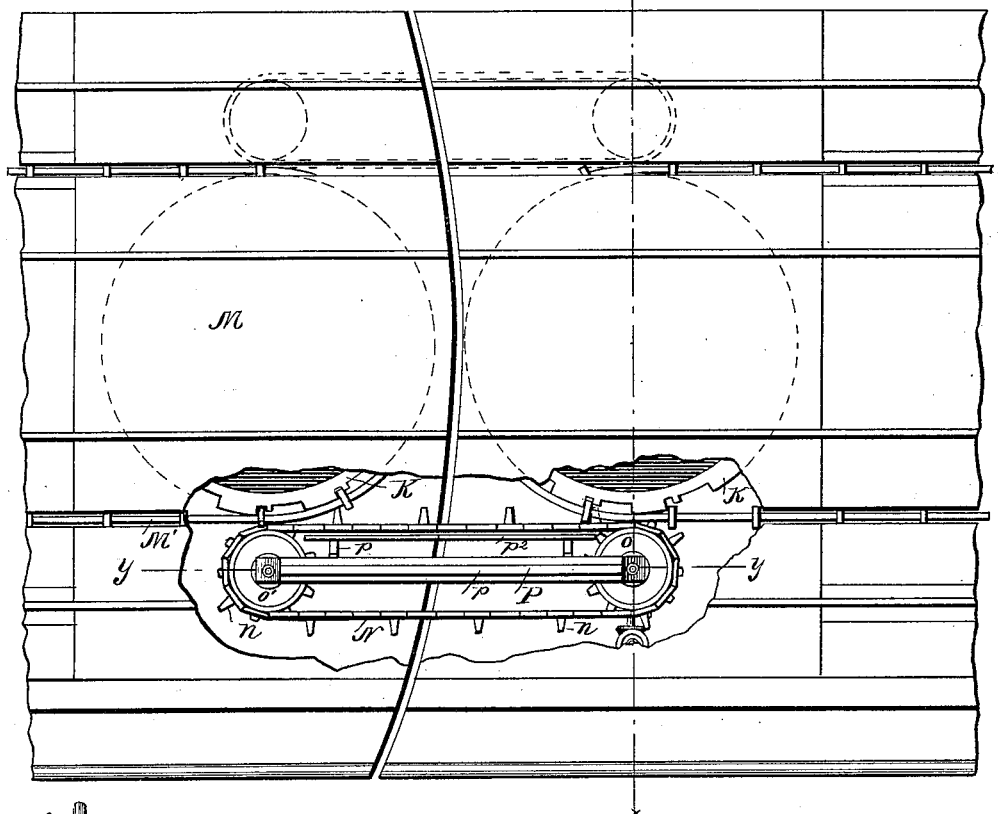
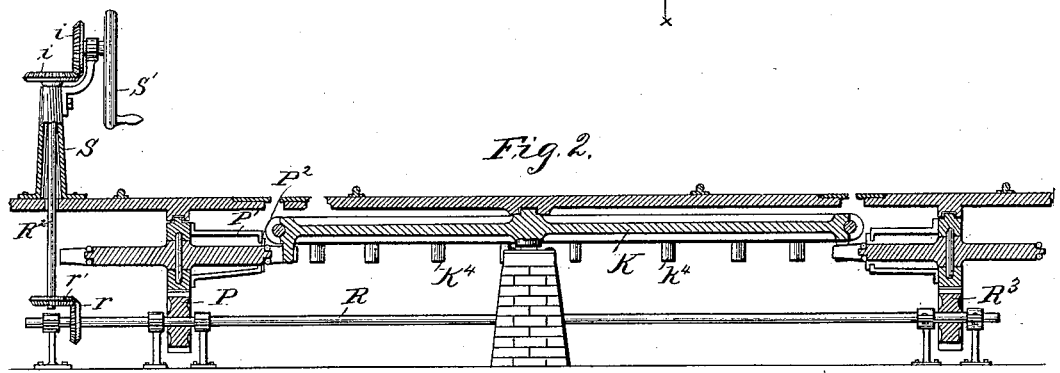
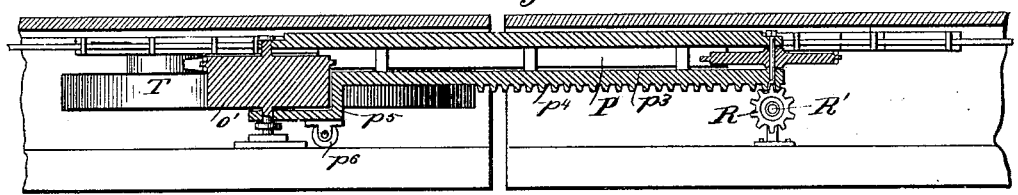
Witnesses.
W. Rossiter
Wm. Rheem
Inventor:
Hobart W. McNeill
By Denis Fisher
Atty.

UNITED STATES PATENT OFFICE.

HOBART W. McNEILL, OF OSKALOOSA, IOWA, ASSIGNOR TO THE RASMUSEN CABLE COMPANY, OF CHICAGO, ILLINOIS.

CABLE-RAILWAY APPARATUS.

SPECIFICATION forming part of Letters Patent No. 390,690, dated October 9, 1888.

Original application filed April 28, 1886. Serial No. 200,446. Divided and this application filed September 9, 1886, Serial No. 213,075. (No model.)

*To all whom it may concern:*

Be it known that I, HOBART W. MCNEILL, a citizen of the United States, residing at Oskaloosa, in the State of Iowa, have invented certain new and useful Improvements in Cable-Railway Apparatus, of which I do declare the following to be a full, clear, and exact description, reference being had to the accompanying drawings, forming part of this specification.

My present invention, while capable of general application to cable railways, has relation particularly to that class of the same wherein the propulsion of the car is effected by means of an endless cable traveling within a tube or tunnel between the tracks, said cable being provided at suitable intervals throughout its length with stops adapted to engage with an arm or arms projecting from the car through the top of the cable-tube; and more especially does my invention relate to the improvement of such apparatus as is used in cable-railway systems of the character set forth in certain Letters Patent granted to C. W. Rasmusen October 25, 1881, and October 24, 1882.

The objects of my invention are, first, to provide means whereby cable cars may be transferred across the swinging or draw-bridges that intersect the roadway.

To this end my invention consists in placing upon the bridge a supplemental cable, and providing means whereby said supplemental cable may be thrown into and out of gear with suitable terminal drums or supports for reversing the direction of travel of the main cable at each abutment of the bridge.

In this connection, also, my invention consists, first, in providing short connecting-cables between the main cable and the bridge-cable, whereby the car may be transferred from the one to the other; secondly, in providing a friction-gear between the main cable and the bridge-cable, whereby the latter may be gradually started; thirdly, in mechanism for throwing the short cables which serve to connect the main and bridge cables into and out of gear with the latter.

Figure 1 is a plan view of the roadway, showing the end of the bridge and the adjoining abutment, the flooring being broken away to display the subjacent mechanism. Fig. 2 is a view in transverse section on the line $x\ x$ of Fig. 1. Fig. 3 is a view in vertical section on the line $y\ y$ of Fig. 1.

Mounted upon the abutments or approaches at each end of the bridge is a large terminal drum, K, the diameter of which is preferably equal to the distance between the cable-tubes of the adjoining railway-tracks. The periphery of this drum is provided with a groove adapted to receive the main driving-cable, and at intervals about its circuit is furnished with notched seats to receive the cable-stops and the wheels of the cable-trucks, as set out in the application filed by me April 28, 1886.

Projecting downwardly from the under side of the rim of the terminal drum K are a series of studs or pins, $k^4$, located immediately back of the seats formed in the periphery of such drum, as above stated, to receive the stops upon the main cable.

At each end of the bridge M is arranged a terminal drum, K, similar in construction to that already described, and around such bridge-drums extends an endless supplemental cable, M', provided with stops thereon corresponding in number and position with the like stops upon the main cable, and provided, also, if desired, with sustaining-trucks to carry and maintain the cable in proper relation, as fully set forth in the application for patent above mentioned. In order to communicate motion to the supplemental or bridge cable from the cable of the main line, and at the same time to provide a means for transferring the car continuously from one cable to the other, the short connecting-cables N are employed, two of such cables being placed upon opposite sides of the terminal drums K at each end of the bridge and the adjoining abutments. These connecting-cables N may be made in the form of sprocket-chains passing over suitable sprocket-wheels, O and O', the axles of which are sustained at the opposite ends of a traveling frame, P. At suitable distances throughout the length of the connecting-chain N are placed the studs or projections $n$, which engage with the pins $k^4$, depending from the rim of the terminal drum K of the main cable and receive motion from such drum as it is revolved by the main cable.

From the upper bar, $p$, of the traveling frame P extend the arms $p'$, to which is connected a flat bar, $p^2$, that extends between the drums O and O' and serves as a bearing-support for the connecting-cable N. The under side of the lower bar, $p^3$, is provided with the rack $p^4$, as shown, and the outer end of this lower bar is downwardly bent, as at $p^5$, and is provided with a friction-wheel, $p^6$, whereon the ends of the traveling frame are sustained. The racks $p^4$ rest upon and engage with the pinion R upon the shaft R', the outer end of this shaft being provided with a miter-gear, $r$, that meshes with a corresponding miter-gear, $r'$, on the end of the vertical shaft R², which is sustained by the standard S and receives motion through the miter gear-wheels $s$ and $s'$ and the hand-crank S'. The shaft R' extends across the abutment and is provided at its opposite end with a pinion, R³, which engages with the traveling frame of the adjoining track of the roadway, as seen in Fig. 2. The sprocket-wheel O' at the outer end of the traveling frame P has its lower portion formed as a friction-drum, which engages with the frictional drum T, formed beneath the periphery of the terminal bridge-drum.

From the construction as thus defined it will be seen that the connecting-chain N, by reason of the fact that its teeth are engaged with the pins $k^4$ of the terminal drum of the main cable, is constantly driven by such drum. If, therefore, by turning the crank S' and the shafts R' and R² the driving-frames P are caused to move forward to the position shown in Figs. 1 and 3, the friction-drum of the sprocket-wheels O and O' will be forced into engagement with the friction-drum T of the terminal drum upon the bridge and will cause this drum to gradually revolve and impart movement to the supplemental or bridge cable M'.

It will also be seen that as the projecting arm of the sprocket-wheel of the car is moved along in front of one of the stops of the main cable one of the teeth or studs of the connecting-cable N will pass behind said arm and will move said arm forward from the main cable until it passes in front of one of the stops of the supplemental or bridge cables, which latter stop will thus continue to advance the arm of the car across the bridge. When the bridge is to be swung open in order to permit the passage of vessels, the crank-arm S' will be turned in such manner as to cause the pinions R and R³ of the shaft R' to move the traveling frame backward until the drum O' is in such position as to no longer obstruct the swinging of the bridge.

By the foregoing construction, the details of which can be varied within wide limits, I am enabled to provide means whereby cable cars can be readily transferred across bridges that may intersect the lines. By providing a friction-gear for communicating movement from the main cable to the supplemental cable of the bridge I am enabled to gradually start such supplemental cable, and thereby avoid all danger of breakage which would be liable to occur in case the entire power of the main cable were exerted at once to overcome the inertia of the supplemental cable and its drum.

It is readily understood that certain features of the invention may be employed without adopting the invention as an entirety. Thus, for example, the connecting chains or cables for transferring cars from the main to the supplemental cable may be used with any suitable means for imparting movement to the supplemental cable, and so, also, the use of a friction-gear for transmitting movement to the supplemental cable from the main cable will be of value whether connecting chains or cables be used for transferring the cars or not.

Having thus described my invention, what I claim as new, and desire to secure by Letters Patent, is—

1. In cable-railway apparatus, the combination, with the main cable and suitable terminal drums or supports for reversing the direction of travel of said main cable at each abutment of the bridge, of a supplemental cable upon the bridge and suitable means whereby said supplemental cable may be thrown into and out of gear with the main cable, substantially as described.

2. In cable-railway apparatus, the combination, with the main cable suitably mounted at the abutment of the draw-bridge, of a supplemental cable upon the bridge and short connecting-cables adapted to extend between the main cable and the bridge-cable and to serve to transfer the cars from one cable to the other, substantially as described.

3. In cable-railway apparatus, the combination, with the main cables and suitable terminal drums or supports at each end of the bridge, of a supplemental cable upon the bridge, one or more connecting cables or chains adapted to extend between said main cables and bridge-cable, and a movable support for said connecting-cable, substantially as described.

4. In cable-railway apparatus, the combination, with the main cables and their terminal drums at each end of the bridge, of a supplemental cable upon the bridge, connecting chains or cables for throwing said main cables and bridge-cable into gear, movable supports for said connecting-cables, and suitable operating mechanism for said supports, substantially as described.

5. In cable-railway apparatus, the combination, with the main cables having stops thereon to engage with an arm projecting from the car, of terminal drums for said cables located at each end of the bridge, a supplemental cable provided with stops and located upon the bridge, suitable drums for said main and supplemental cables, and means for throwing said supplemental cables into and out of gear, substantially as described.

6. In cable-railway apparatus, the combination, with the main cables having stops thereon and their terminal drums at each end of a bridge, of a supplemental cable having stops thereon and sustained upon the bridge, and connecting chains or cables having stops thereon and arranged to extend between said main cable and bridge-cable, substantially as described.

7. In cable-railway apparatus, the combination, with the main cable suitably mounted at the abutment of the bridge, of a supplemental cable upon the bridge and a friction-gear for imparting movement from the main cable to the supplemental cable, substantially as described.

8. In cable-railway apparatus, the combination, with the main cable suitably mounted at the abutment of the bridge, of a supplemental cable upon the bridge and a friction gear-wheel and movable bearings whereby said gear-wheel may be thrown into and out of gear, substantially as described.

9. The combination, with an endless cable system for moving street-cars, of a supplemental endless cable operated by power transmitted by the main cable, and an intermediate friction-drum for the said transmission of power from the main cable to the supplemental cable, substantially as described.

10. In a cable-railway apparatus, the combination, with a main cable suitably mounted at the abutments of a bridge and a supplemental cable suitably mounted upon the bridge, of an adjustable friction-wheel for transmitting power from the main cable to the supplemental cable, substantially as described.

HOBART W. McNEILL.

Witnesses:
JAMES H. PEIRCE,
ALFRED W. RASMUSSEN.